US008140665B2

(12) United States Patent
Malloy et al.

(10) Patent No.: US 8,140,665 B2
(45) Date of Patent: Mar. 20, 2012

(54) MANAGING CAPTURED NETWORK TRAFFIC DATA

(75) Inventors: Patrick J. Malloy, Washington, DC (US); Michael S. Canney, Cedar Rapids, IA (US); Ryan Gehl, Silver Spring, MD (US); Marc A. Cohen, Washington, DC (US); Eric S. Nudelman, Chevy Chase, MD (US); Russell Mark Elsner, Bethesda, MD (US); Marc I. Schneider, Arlington, VA (US)

(73) Assignee: OPNET Technologies, Inc., Bethesda, MD (US)

( * ) Notice: Subject to any disclaimer, the term of this patent is extended or adjusted under 35 U.S.C. 154(b) by 913 days.

(21) Appl. No.: 11/507,114

(22) Filed: Aug. 19, 2006

(65) Prior Publication Data

US 2007/0067450 A1  Mar. 22, 2007

Related U.S. Application Data

(60) Provisional application No. 60/709,705, filed on Aug. 20, 2005.

(51) Int. Cl.
    *G06F 15/173* (2006.01)
(52) U.S. Cl. ..................................................... 709/224
(58) Field of Classification Search .................. 709/223, 709/224, 225, 226; 717/127
    See application file for complete search history.

(56) References Cited

U.S. PATENT DOCUMENTS

| 5,375,199 | A | * | 12/1994 | Harrow et al. | 715/771 |
|---|---|---|---|---|---|
| 6,061,724 | A | * | 5/2000 | Ries et al. | 709/224 |
| 6,313,768 | B1 | | 11/2001 | Allen | |
| 6,449,739 | B1 | * | 9/2002 | Landan | 714/47.2 |
| 6,529,954 | B1 | | 3/2003 | Cookmeyer, II et al. | |
| 6,781,959 | B1 | | 8/2004 | Garakani et al. | |
| 6,801,940 | B1 | | 10/2004 | Moran et al. | |
| 6,871,227 | B2 | | 3/2005 | Allen | |
| 6,975,330 | B1 | * | 12/2005 | Charlton et al. | 345/593 |
| 7,010,593 | B2 | | 3/2006 | Raymond | |
| 7,197,559 | B2 | * | 3/2007 | Goldstein et al. | 709/224 |
| 7,218,928 | B2 | * | 5/2007 | Park et al. | 455/423 |
| 7,290,048 | B1 | * | 10/2007 | Barnett et al. | 709/223 |
| 7,293,287 | B2 | * | 11/2007 | Fischman et al. | 726/22 |
| 7,392,234 | B2 | * | 6/2008 | Shaath et al. | 707/1 |
| 7,467,202 | B2 | * | 12/2008 | Savchuk | 709/224 |
| 7,546,368 | B2 | * | 6/2009 | Drees et al. | 709/224 |
| 7,577,689 | B1 | * | 8/2009 | Masinter et al. | 707/204 |
| 7,606,165 | B2 | * | 10/2009 | Qiu et al. | 370/252 |

(Continued)

OTHER PUBLICATIONS

U.S. Appl. No. 11/506,649, Malloy et al.; System and Method for Identifying a Transaction of Interest Within a Network.

*Primary Examiner* — Ario Etienne
*Assistant Examiner* — Sargon Nano

(57) ABSTRACT

A system and method for managing captured network traffic data is provided. The invention comprises a plurality of capture agents, each being configured to capture the network traffic associated with one or more applications. Each application is associated with one or more capture agents according to an application profile that is stored and maintained in a capture server. When analysis of an application's network traffic is required, the capture server contacts the corresponding capture agents according to the application profile. The capture server then effects the identification and archiving of the network traffic that corresponds to a user-defined capture condition. A database at the capture server maintains a record that associates the corresponding network traffic with the user-defined capture condition such that the corresponding network traffic can later be retrieved and analyzed using an analysis engine.

51 Claims, 4 Drawing Sheets

U.S. PATENT DOCUMENTS

| | | | |
|---|---|---|---|
| 7,730,172 B1* | 6/2010 | Lewis | 709/224 |
| 7,891,000 B1* | 2/2011 | Rangamani et al. | 726/22 |
| 7,925,729 B2* | 4/2011 | Bush et al. | 709/223 |
| 7,954,144 B1* | 5/2011 | Ebrahimi et al. | 726/12 |
| 7,979,522 B2* | 7/2011 | Lunsford | 709/223 |
| 7,984,126 B2* | 7/2011 | McBride | 709/223 |
| 2002/0078195 A1 | 6/2002 | Allen | |
| 2002/0124070 A1* | 9/2002 | Pulsipher | 709/223 |
| 2002/0198985 A1* | 12/2002 | Fraenkel et al. | 709/224 |
| 2003/0065986 A1* | 4/2003 | Fraenkel et al. | 714/47 |
| 2003/0131098 A1* | 7/2003 | Huntington et al. | 709/224 |
| 2003/0135612 A1* | 7/2003 | Huntington et al. | 709/224 |
| 2004/0049693 A1* | 3/2004 | Douglas | 713/200 |
| 2005/0064820 A1* | 3/2005 | Park et al. | 455/67.11 |
| 2005/0102402 A1* | 5/2005 | Whitehead | 709/226 |
| 2005/0108379 A1* | 5/2005 | Gray et al. | 709/223 |
| 2005/0195797 A1 | 9/2005 | Kryuchkov et al. | |
| 2006/0274684 A1* | 12/2006 | Diener | 370/318 |
| 2008/0263112 A1* | 10/2008 | Shaath et al. | 707/204 |
| 2009/0204704 A1* | 8/2009 | Muret et al. | 709/224 |
| 2011/0167145 A1* | 7/2011 | Bush et al. | 709/223 |
| 2011/0213869 A1* | 9/2011 | Korsunsky et al. | 709/223 |

* cited by examiner

MANAGING CAPTURED NETWORK TRAFFIC DATA

This application claims the benefit of U.S. Provisional Patent Application 60/709,705, filed 20 Aug. 2005.

BACKGROUND AND SUMMARY OF THE INVENTION

This invention relates to the field of network application performance analysis, and in particular to a method and system that facilitates managing network traffic data that is recorded at a variety of sources.

As corporate IT infrastructures continue to grow and become more complex, so does the task of supporting the mix of applications and the networks they run on. There are a variety of problems that can affect the performance of a network application. To start with, the application may not have been engineered to handle certain network conditions. Additionally, dropped packets, excessive delays, and other network errors can cause the application to run slowly or improperly. In some scenarios, there may be hundreds or even thousands of users working with a network-intensive application. Problems with the network can then lead to a serious decrease in productivity as well as a major increase in costs. Accordingly, the industry could benefit from both proactive and reactive approaches for addressing network application performance issues.

Many of the prior art approaches for addressing network application performances issues involve the use of capture agents. A capture agent is a network monitoring tool, commonly referred to as a "sniffer" or "protocol analyzer", that is used to capture network traffic data. Multiple capture agents can be placed at various points within a network and are configured to monitor the traffic flowing through those points. The captured data can then be analyzed by application developers or expert troubleshooters to improve an application's performance or resolve network or application problems. In some scenarios, however, there may be hundreds or even thousands of capture agents in a network. The task of determining which agents are best associated with a particular application or problem can thus be very cumbersome. The present invention addresses this issue by employing a centrally located capture server that manages the potentially large number of capture agents and provides an array of capture management services.

Some of the capture management services provided by the capture server are configured to improve upon prior art troubleshooting techniques. For example, larger organizations such as corporations, governments, and universities traditionally employ teams of troubleshooters that are tasked with maintaining the integrity of the internal network and its devices. When problems occur, the users typically communicate with the troubleshooters via web-based trouble ticketing systems, which provide services for reporting the details associated with the problems. Such details might include the application with which a user is experiencing a problem and the time at which the problem occurred. These details make up a trouble ticket, which then serves as a primary source for determining an appropriate resolution to the problem. A fundamental drawback to this approach is that the user may know little more about the problem than the simple fact that there is one. Accordingly, the trouble ticket will only reflect the symptoms experienced by the user, and not the network conditions associated with the problem at hand. One objective of the present invention is to automatically identify the captured network traffic data that is associated with a reported problem and to make that data accessible for analysis to anyone investigating the problem.

Some other capture management services provided by the capture server are configured to improve upon prior art network application development techniques. In an ideal world, application developers would have the knowledge, time, and resources to adequately test their software in a variety of network environmental conditions. The real world, however, doesn't offer the necessary time and resources for this degree of testing. Application developers must instead rely upon simulations that can quickly determine how an application will perform in different network environments. These simulations require a baseline set of network traffic data that is captured while running the application in a live network. As the size and complexity of a network increases, so does the task of gathering the relevant network traffic data. The developer must first identify and/or configure the one or more capture agents that are associated with the application under development. Then the developer must coordinate the capturing of network traffic data with the execution of the application. Finally, the relevant traffic data must be extracted from each of the capture agents, downloaded to the developer's workstation, and loaded into the simulation software. Another objective of the present invention is to automate the tasks of identifying the capture agents associated with a particular application, coordinating the capturing of network traffic data, and extracting the relevant data for analysis.

The aforementioned objectives and others are achieved by a system and method for managing captured network traffic data. The invention comprises a plurality of capture agents, each being configured to capture the network traffic associated with one or more applications. Each application is associated with one or more capture agents according to an application profile that is stored and maintained in a capture server. When analysis of an application's network traffic is required, the capture server contacts the corresponding capture agents according to the application profile. The capture server then effects the identification and archiving of the network traffic that corresponds to a user-defined capture condition. A database at the capture server maintains a record that associates the corresponding network traffic with the user-defined capture condition such that the corresponding network traffic can later be retrieved and analyzed using an analysis engine.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

Figure 1:
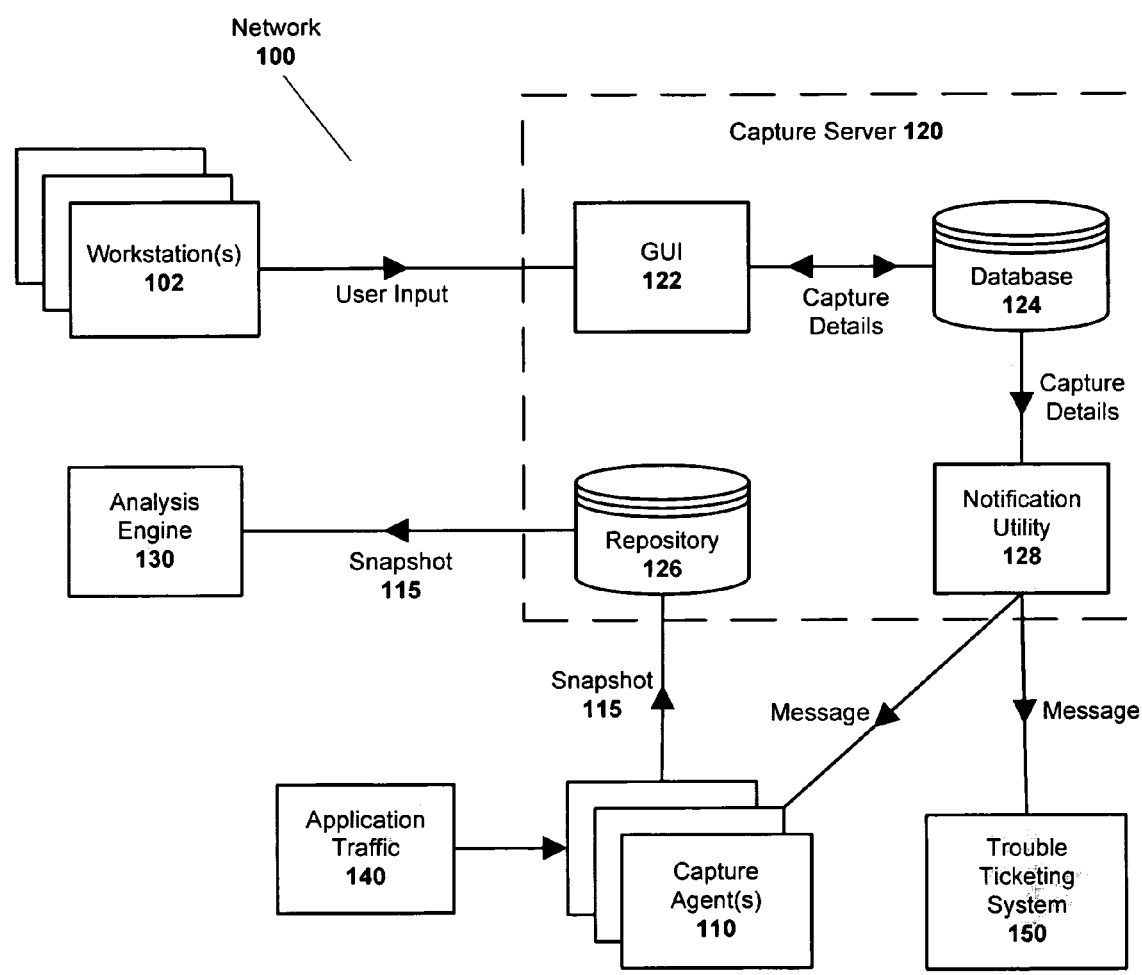
FIG. 1 illustrates an example configuration of the inventive system.

The present invention is designed to address many of the drawbacks associated with the prior art means for troubleshooting network application performance problems and for predicting a network application's performance under a variety of network conditions. FIG. 1 illustrates an exemplary configuration of the inventive system, wherein a variety of components are connected through network 100. Further details on each of these components are provided below.

The first major component of the invention is the capture agent 110. A plurality of capture agents 110 can be placed at various points within the network 100 and are configured to monitor and record the traffic flowing through those points. In most cases, the capture agents 110 are placed near or at the application servers operating in the network 100. This insures that the application traffic 140 associated with each network application will be properly recorded. In some scenarios, there may even be multiple capture agents 110 installed at the same location, wherein each capture agent is configured to capture only a specific subset of the total traffic. For example, one capture agent could be configured to capture only HTTP traffic on port 80, while another capture agent could be configured to capture FTP traffic on port 20.

The capture agents 110 typically operate in one of two modes. The first mode is a continuous mode wherein data is always being captured. In this mode, new capture data replaces older data after a predetermined storage threshold has been reached. Continuous capturing is most effective for troubleshooting unexpected problems or events. For example, when new network application performance problems occur, the troubleshooters can identify the one or more capture agents 110 that are likely to have captured the traffic associated with the problem, download the corresponding data, and troubleshoot the problem using one or more analysis tools, such as the analysis engine 130.

The second mode is an on-demand mode wherein the capturing of network traffic is explicitly started and stopped by a user or some predefined triggering event. This mode is best suited for application development or other controlled scenarios. For example, application developers may wish to capture traffic while testing a specific transaction. By having complete control over when the capture is started and stopped, the developers can more easily capture only the traffic that is of interest.

Without the present invention, consistently using the capture agents in either of the two aforementioned modes can be difficult. As the size of the network increases, so does the task of understanding the locations and configurations of each of the capture agents. Additionally, as the numbers of applications and problems increase, there may be no way to easily manage and archive the interesting capture data. The capture server 120 provides the organizational services that are necessary to address these weaknesses.

The capture server 120 is preferably a computer system that is configured to provide numerous services to other computing devices over the network 100. Many of these services are dependent upon the association of the capture agents 110 in the network 100 with the network applications they are configured to monitor. The associations are created by configuring one or more application profiles within the capture server 120. Application profiles map a particular network application to all of the capture agents 110 that might be associated with it. For example, a network application might be implemented using an application server and a database server. If a capture agent 110 is installed near or at both the application server and the database server, the application profile would include the hostname of each along with any additional information necessary to access the capture data. In a preferred embodiment, a hostname, port number, and capture name are sufficient to access the capture data. Application profiles are preferably stored in a database 124 located within the capture server 120.

User access to the capture server 120 is preferably provided via a graphical user interface or GUI 122. Interaction with any GUI is commonly achieved through the use of one or more input devices. Typical input devices include the mouse and keyboard, both of which are designed to manipulate a plurality of graphical elements on a display through various clicks and key presses. The GUI 122 of the present invention is preferably a secure web-based interface comprising one or more web pages, wherein the one or more web pages are configured to enable each registered user to utilize one or more of the capture management services. Access to the GUI 122 is preferably facilitated by a web browser installed at a user workstation 102. It should be understood by one of ordinary skill in the art that the GUI 122 need not be a web interface, and could alternatively be provided as part of an alternative software application.

The capture server 120 is preferably configured by one or more network administrators. Administrators are primarily tasked with managing user accounts and application profiles. User accounts are stored in the database 124 and preferably include at least a user name and one or more user privileges. The user name attribute is the name or moniker associated with a user that is registered to access the system, and the user privileges attribute identifies the one or more services that a user can or cannot utilize at the capture server 120. Administrators are free to create, modify, and delete user accounts as necessary, preferably using the GUI 122.

Figure 2:
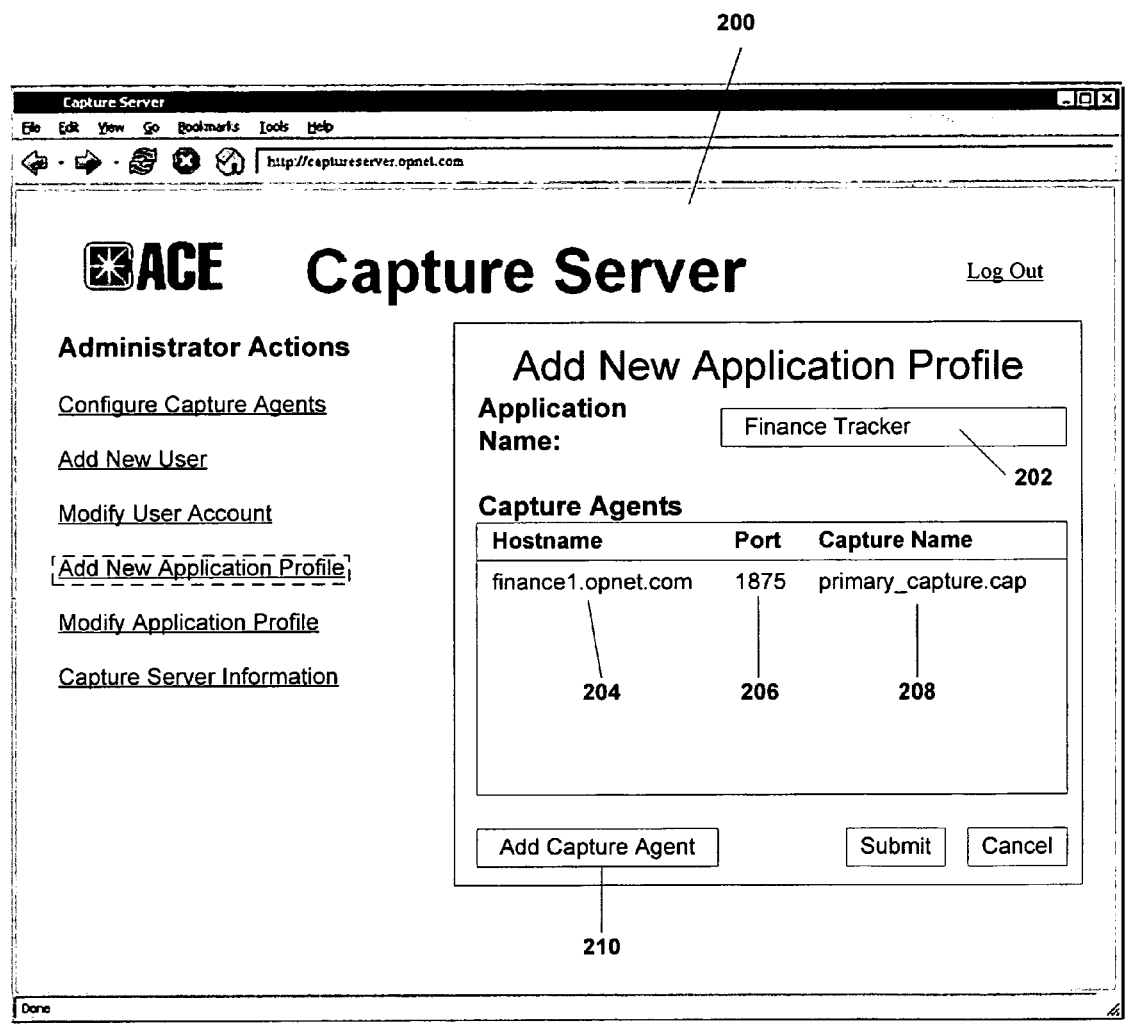
FIG. 2 illustrates an example user interface for creating a new application profile in accordance with the invention.

As discussed above, an application profile links a particular software application with each capture agent 110 that is configured to capture the application's network traffic. Administrators can preferably use the GUI 122 to add, modify, and delete application profiles as desired. To create a new application profile, an administrator might input an application name and then create an entry for each capture agent 110 that is to be associated with the application. FIG. 2 illustrates an example of a web page 200 with which an administrator could create an application profile. The application name can be inputted into field 202, and capture agent entries can be created by selecting the "Add Capture Agent" button 210 and subsequently inputting the capture agent's network address 204, the port number 206 with which access to the capture agent 110 can be achieved, and the name of the corresponding capture file 208.

Figure 3:
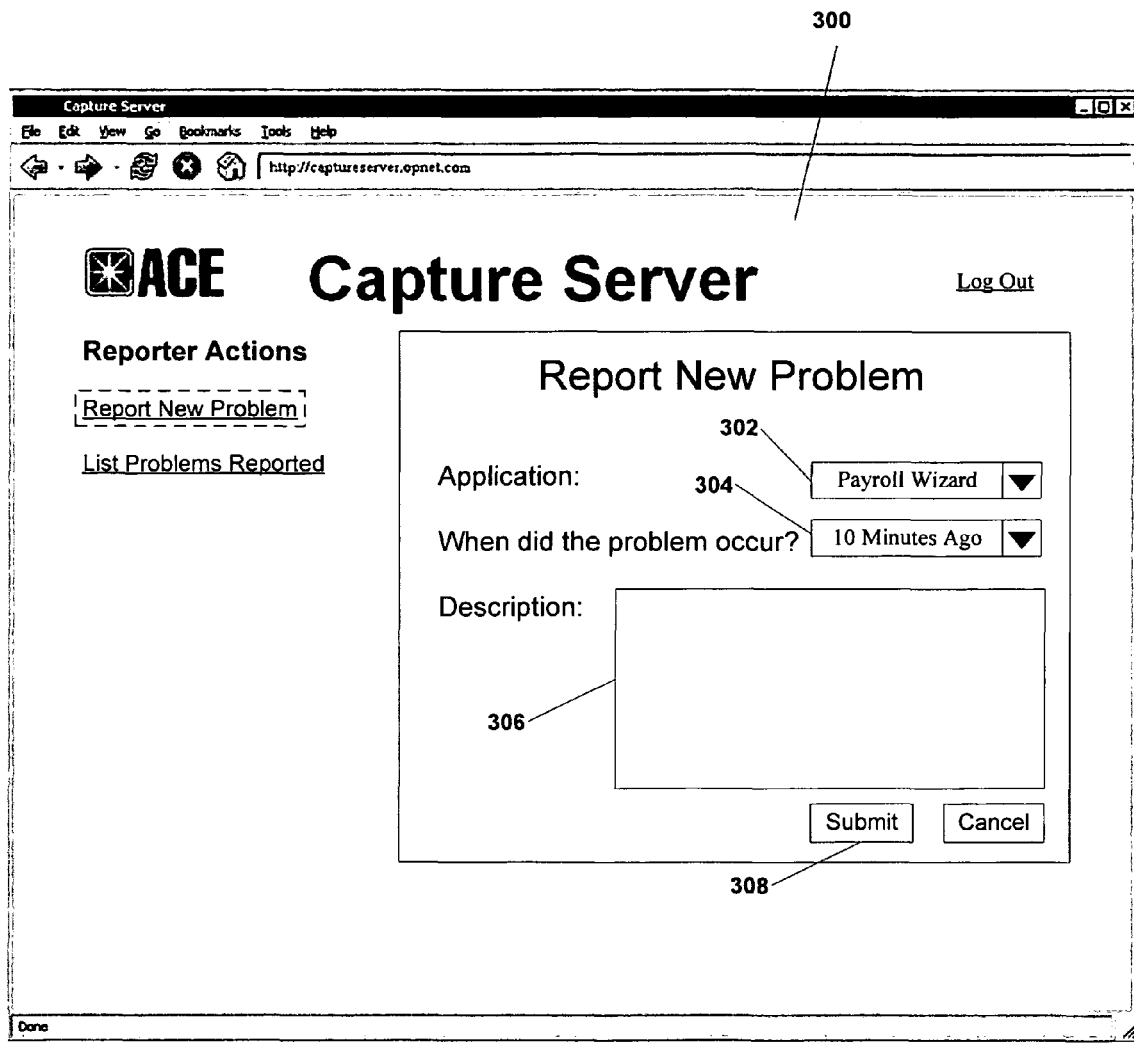
FIG. 3 illustrates an example user interface for reporting a new problem in accordance with the invention.

The application profiles are used in conjunction with two primary embodiments of the present invention. The first is a troubleshooting embodiment in which the capture agents operate in a continuous mode. In this embodiment, after the application profiles have been configured, the capture server 120 is capable of accepting problem reports. Problem reports are supplied by users that are experiencing difficulties with the network applications. For example, if a user executes a certain application transaction and the response time is abnormally slow or the transaction fails completely, the user can report the problem using the GUI 122. As an added convenience, shortcuts installed within the problem application or within the user's operating system could provide the user with instant access to the GUI 122. A problem report preferably comprises the name of the problem application, the time at which the problem occurred, and a description of the problem. Web page 300 in FIG. 3 provides one example of a user interface that could be used to create a problem report. The application drop-down box 302 enables the user to select an application, while the time drop-down box 304 enables the user to select the time at which the problem occurred. The description box 306 enables the user to input a textual description of the problem, and the "Submit" button 308 effectively causes the problem report to be processed by the capture server 120.

As soon as a user selects the "Submit" button 308 of web page 300, several procedures are automatically performed. The capture server 120 first creates a new capture record comprising the user-supplied problem details and stores the record in the database 124. In addition to the user-supplied information, the capture record preferably includes the user's username, an automatically generated capture ID (CID), and a timestamp of when the problem was reported. Additional information, such as problem status, problem severity, or the name of a troubleshooter assigned to address the problem can also be included. Next, the CID, the time of the reported problem, and the corresponding application profile information are supplied as input to a notification utility 128. The notification utility 128 is highly configurable, but is primarily responsible for notifying the capture agents 110 and other users of a reported problem. To perform these tasks, the notification utility 128 utilizes the application profile information to determine which capture agents 110 are associated with the problem application. The notification utility 128 then generates a problem notification message, which is sent to the capture agents 110 using the corresponding hostname, port, and capture name information. The notification message causes the capture agents 110 to create a "snapshot" 115 of the application traffic 140 that corresponds to the time at which the problem occurred. For example, if a user reports that a problem occurred around 3:35 pm, the notification message might instruct the capture agent 110 to retain all data captured between 3:30 pm and 3:40 pm. The capture window size is determined according to a plurality of "padding" factors that are dependent upon the user, the application, and the nature of the reported problem. The "padding" factors are configurable by the administrators and can vary from one user or application to another. In general, however, a few minutes of capture data is usually sufficient for most problems.

In one embodiment, the snapshot 115 can be an actual snapshot, in which the capture data of interest is directly copied to a separate capture file. In a preferred embodiment, the snapshot is a virtual snapshot. In this embodiment, the capture agent 110 is notified of a time region to save, along with additional identifying information about the reported problem (e.g., the CID). By using one of several locking mechanisms known in the art, for example in-memory locking or file-based locking, the capture agent 110 is able to differentiate between the data that can be safely overwritten and the data that needs to be retained. When aging out data as part of the continuous capture process, the capture agent 110 will retain any data that has been locked (i.e., identified as part of one or more snapshots). In one embodiment, capture agent configuration options control the maximum amount of snapshot data to store. The snapshot 115 can be stored at the same location as the capture agent or, in the preferred embodiment, be automatically downloaded to a repository 126 at the capture server 120. The downloading can occur immediately or at regular times of low network activity (e.g., 2:00 am every Monday, Wednesday, and Friday). The speed of the download can further be limited in order to conserve bandwidth. With each successful creation of a snapshot 115, the capture server 120 appends the details (preferably the name, time, time, size, and location) of the snapshot 115 to the corresponding capture record.

By centrally managing the snapshot data, administrators are able to configure, through the capture server 120, rules and policies for deleting outdated snapshot data. In a network with hundreds or thousands of capture agents 110, managing the snapshot data in a central location is appealing for a variety of other reasons. For one, this ensures that the snapshot data is in a known location when a troubleshooter is ready to investigate the problem. Central management further allows the snapshot data to be archived, thereby increasing the likelihood of being able to investigate multiple instances of a single intermittent problem. For example, if the same intermittent problem is seen by each of three different user groups, the central management of snapshot data and capture records makes it more likely that a troubleshooter will be able to identify a new problem as really being another occurrence of a previously reported problem.

As mentioned above, the notification utility 128 is also responsible for notifying other users of a reported problem. One major advantage of the notification utility 128 is that it can integrate with existing trouble ticketing systems. For example, the notification utility 128 can be configured to automatically transmit a notification message to a trouble ticketing system 150, wherein the notification message comprises a CID and problem description. The existing trouble ticketing system 150 can then create a new trouble ticket according to the notification message and process it according to a company's own specifications. Such specifications might include notifying a particular expert troubleshooter directly, or notifying a team of troubleshooters and allowing them to claim the trouble ticket according to their current workload, expertise, etc. It should be easily recognized by one of ordinary skill in the art that the notification utility 128 could be integrated with nearly any trouble ticketing system comprising any set of independent policies and procedures.

In an alternative embodiment, the notification utility 128 can be configured to notify other users directly by sending electronic messages, posting problem reports to a web page, generating voice messages, or by performing other types of notification.

Once the notification utility 128 completes its designated tasks, the capture server 120 enables the expert troubleshooters to review the details of a reported problem and begin the analysis process. For example, a particular troubleshooter or a group of troubleshooters might be notified of a reported problem according to one of the notification procedures described above. A troubleshooter then connects to the capture server 120, accesses the GUI 122, and reviews the capture record. As discussed above, the capture record comprises a listing of each snapshot associated with the problem. Should the troubleshooter determine that further investigation is required; he can download one or more snapshots 115 from the capture agents 110 or in the preferred embodiment, the repository 126, to his workstation and analyze them using the analysis engine 130. The analysis engine 130 could be integrated into the capture server 120, but is preferably installed at the troubleshooter's workstation.

Figure 4:
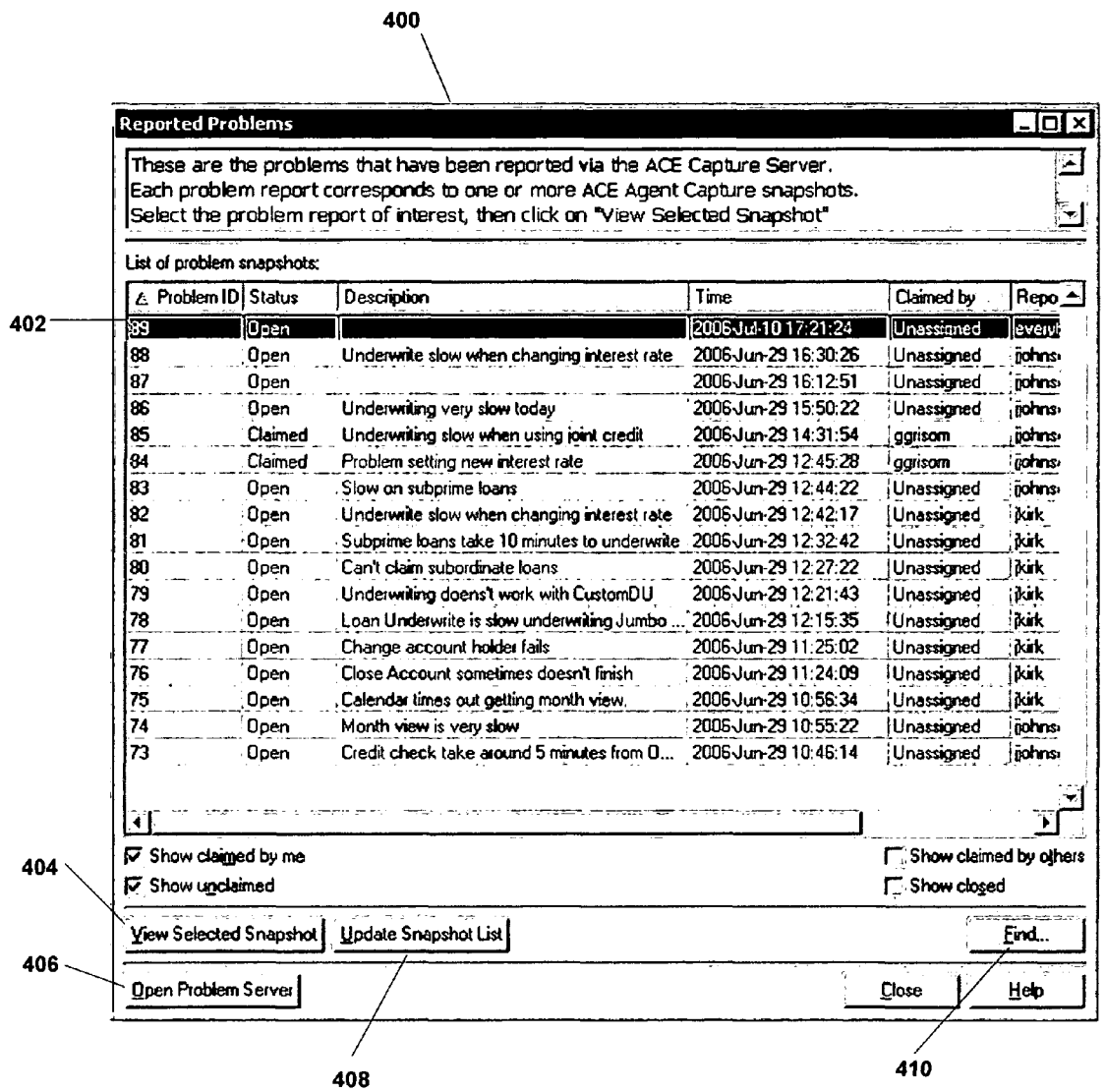
FIG. 4 illustrates an example user interface for reviewing and selecting a portion of network traffic to be analyzed in accordance with the invention.

In a preferred embodiment, the analysis engine 130 is capable of communicating directly with the capture server 120. In this manner, when a troubleshooter wishes to analyze the snapshot data associated with a particular problem, the capture server 120 can provide the analysis engine 130 with listings of all available snapshots 115. These listings preferably include many of the details from the corresponding capture records, e.g., the CID, the problem description, the name of the user that reported the problem, etc. FIG. 4 illustrates a sample GUI 400 that could be used in accordance with the present invention. The GUI 400 includes a listing 402 of each snapshot 115 presently available for analysis. The troubleshooter can highlight a particular listing 402 that corresponds with the problem he is investigating and select the "View Selected Snapshot" 404 button to download the snapshot 115 and load it into the analysis engine 130. The capture manager 120 facilitates the downloading process by indicating the location of a selected snapshot 115 to the analysis engine 130. Other options in GUI 400 include selecting the "Update Snapshot List" button 408, the "Open Problem Server" button 406, or the "Find" button 410, which enables the troubleshooter to search for a particular snapshot listing according to any of the available capture record details.

In the same or an additional embodiment, the troubleshooter can preview the snapshot 115 prior to downloading, and can selectively download only a portion of the snapshot for analysis. In this manner, a potentially large snapshot can be viewed in a simplified form prior to downloading and any non-relevant traffic positioned before and/or after the traffic of interest can be easily excluded.

After downloading and loading the snapshot 115 into the analysis engine 130, the troubleshooter can preferably execute a variety of analytical and simulation procedures designed to help identify the cause of an application performance problem. One such analysis engine is the Application Characterization Interface (ACE) traffic analysis system from OPNET Technologies, Inc., Bethesda, Md. One of ordinary skill in the art will recognize that any tool capable of analyzing the snapshot data could be used in accordance with the present invention.

Once the troubleshooter has completed his investigation of a problem, he can re-access the capture manager 120 to update the capture record accordingly. For example, if no further action needs to be taken, the troubleshooter might update the problem details to include the results of the analysis and mark the problem as resolved.

The second primary embodiment of the present invention is a development embodiment in which the capture agents operate in an on-demand mode. In this embodiment application developers can explicitly control the capturing of application traffic associated with applications under development. Developers wishing to analyze or predict the performance of their applications can preferably connect to the capture server 120 and access the GUI 122. The developers are then presented with a list of applications, wherein each application is associated with one or more capture agents 110 according to its application profile. Upon selecting a particular application, a CID is automatically generated along with a capture record. The capture record preferably comprises the CID and any user-supplied descriptive information. Next, using controls embedded in the GUI 122, the developer can cause each of the capture agents 110 associated with the selected application to begin capturing network traffic. In other words, when a user selects a "start capturing" control (e.g., a button in a web page), a start command and the CID are supplied as input to the notification utility 128. The notification utility 128 generates a notification message, which is transmitted to each of the corresponding capture agents 110, thereby causing the capture agents 110 to begin capturing data. In the preferred embodiment, the developer can choose which of the associated capture agents 110 to include in the capture.

At this point, the developer is free to execute one or more transactions using the selected application. The traffic associated with each of the transactions will be consequently recorded by the capture agents 110. Upon completing the desired transactions, the developer can return to the GUI 122 and select a "stop capturing" control. This time, the notification utility generates a notification message comprising a stop command and the CID. The notification message is sent to each of the running capture agents 110, thereby causing them to cease capturing network traffic. The traffic captured between the start and stop operations is subsequently saved as a snapshot 115 according to one of the methods described above, and the capture server 120 appends a listing of each successfully created snapshot 115 to the corresponding capture record. Finally, the developer can load one or more of the snapshots into the analysis engine 130 and perform numerous performance analyses and performance prediction simulations, the results of which will aid the developer in producing a more robust application.

In an alternative embodiment, the capture agents 110 corresponding to the developer embodiment could operate in a continuous mode. In this embodiment, instead of signaling the capture agents 110 to start and stop, the capture server 120 would simply record timestamps at each selection of a start and stop command. After a stop command, the notification utility 128 would then notify the capture agents 110 to create snapshots 115 of data corresponding to the time between the recorded timestamps. The snapshots 115 would be stored and analyzed in the same manner as above.

As a further enhancement to any of the aforementioned embodiments, additional traffic filtering techniques could be automatically applied to the snapshots 115 in order to remove extraneous traffic. For example, copending U.S. patent application Ser. No. 11/506,649 entitled SYSTEM AND METHOD FOR IDENTIFYING A TRANSACTION OF INTEREST WITHIN A NETWORK, filed 18 Aug. 2006 for Malloy et al., and incorporated by reference herein, describes techniques for identifying and extracting only the transactions associated with a particular user-level action (ULA). Such techniques could be employed in the present invention to automatically reduce the snapshots 115 to only transactions of interest.

The foregoing merely illustrates the principles of the invention. It will thus be appreciated that those skilled in the art will be able to devise various arrangements which, although not explicitly described or shown herein, embody the principles of the invention and are thus within its spirit and scope. For example, instead of mapping applications to capture agents 110, the capture server 120 could map users to capture agents 110 according to the particular applications the users most frequently utilize. It should further be recognized that the capture services provided by the capture server 120 need not be limited to troubleshooting and development embodiments, and could be used in any embodiment requiring the centralized management of capture data. As a final note, because the capture server 120 maintains a location for each snapshot 115, it should be recognized that the snapshots 115 can be stored and maintained in a variety of locations and configurations that may not have been explicitly mentioned above.

These and other system configuration and optimization features will be evident to one of ordinary skill in the art in view of this disclosure, and are included within the scope of the following claims.

In interpreting these claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) each of the disclosed elements may be comprised of hardware portions (e.g., including discrete and integrated electronic circuitry), software portions (e.g., computer programming), and any combination thereof;
f) hardware portions may be comprised of one or both of analog and digital portions;
g) any of the disclosed devices or portions thereof may be combined together or separated into further portions unless specifically stated otherwise;
h) no specific sequence of acts is intended to be required unless specifically indicated; and
i) the term "plurality of" an element includes two or more of the claimed element, and does not imply any particular range of number of elements; that is, a plurality of elements can be as few as two elements, and can include an immeasurable number of elements.

We claim:

1. A system comprising:
a plurality of capture components that are each configured to continuously record network traffic, wherein new network traffic overwrites old network traffic after a threshold is reached,
a database that includes a plurality of profiles, each profile including a set of capture components of the plurality of capture components associated with a particular capture condition, and
a management component that is configured to:
receive information from which a capture condition can be identified,
retrieve, from the database, the set of capture components associated with the profile corresponding to the identified capture condition, and
effect an archiving of at least a portion of the network traffic that has already been recorded by the set of capture components before the capture condition was identified.

2. The system of claim 1, wherein the management component is further configured to maintain an association of the archived portion of the recorded network traffic and the received information.

3. The system of claim 1, wherein the identified capture condition is an association with an application.

4. The system of claim 1, wherein the identified capture condition is an association with a user.

5. The system of claim 1, wherein at least one capture component of the set of capture components is further configured to store the archived portion of the network traffic in an archive file separate from the recorded network traffic.

6. The system of claim 5, wherein the at least one capture component is further configured to store the archive file at the same location as the recorded network traffic.

7. The system of claim 5, including a repository, wherein the at least one capture component is further configured to transmit the archive file to the repository.

8. The system of claim 1, wherein at least one capture component of the set of traffic components is further configured to lock the archived portion of the recorded network traffic to prevent an overwriting or deletion of the archived portion.

9. The system of claim 1, wherein the management component is further configured to effect a filtering of the network traffic recorded in the archived portion of the recorded network traffic of at least one capture component of the set of capture components.

10. The system of claim 1, including an analytical component that is configured to execute an analysis of the network traffic recorded in the archived portion of the recorded network traffic of at least one capture component of the set of capture components.

11. The system of claim 10, wherein the analysis includes a simulation.

12. The system of claim 1, wherein the received information includes a problem description.

13. The system of claim 12, wherein the problem description includes a problem time.

14. The system of claim 1, wherein the management component includes a user interface component that is configured to receive the information.

15. The system of claim 14, wherein the received information includes a sequence of start and stop commands.

16. The system of claim 1, including a trouble ticketing component that is configured to manage a plurality of trouble tickets corresponding to a plurality of problems.

17. The system of claim 16, wherein the management component includes a notification component that is configured to transmit a notification message to the trouble ticketing component.

18. A method comprising:
configuring a plurality of capture components, such that each capture component is configured to continuously record network traffic, wherein new network traffic overwrites old network traffic after a threshold is reached,
configuring a database to include a plurality of profiles, each profile including a set of capture components of the plurality of capture components associated with a particular capture condition,
receiving information,
identifying a capture condition based on the received information,
retrieving the set of capture components associated with the profile corresponding to the identified capture condition, and
archiving at least a portion of the network traffic that has already been recorded by the set of capture components before the capture condition was identified.

19. The method of claim 18, including maintaining an association of the archived portion of the recorded network traffic with the received information.

20. The method of claim 18, wherein the identified capture condition is an association with an application.

21. The method of claim 18, wherein the identified capture condition is an association with a user.

22. The method of claim 18, including storing the archived portion of the recorded network traffic in an archive file separate from the recorded network traffic.

23. The method of claim 22, including storing the archive file at the same location as the recorded network traffic.

24. The method of claim 22, including transmitting the archive file to a repository.

25. The method of claim 18, including locking the archived portion of the recorded network traffic to prevent an overwriting or deletion of the archived portion.

26. The method of claim 18, including filtering the network traffic recorded in the archived portion of the recorded network traffic.

27. The method of claim 18, including executing an analysis of the network traffic recorded in the archived portion of the recorded network traffic.

28. The method of claim 27, wherein the analysis includes a simulation.

29. The method of claim 18, wherein the received information includes a problem description.

30. The method of claim 29, wherein the problem description includes a problem time.

31. The method of claim 18, including providing a user interface that is configured to receive the information.

32. The method of claim 31, wherein the received information includes a sequence of start and stop commands.

33. The method of claim 18, including configuring a trouble ticking component to manage a plurality of trouble tickets corresponding to a plurality of problems.

34. The method of claim 33, including transmitting a notification message to the trouble ticketing component.

35. A computer program product stored on a non-transient computer readable medium, which, when executed by a processor, causes the processor to:
   instruct each of a plurality of capture components to continuously record network traffic, wherein new network traffic overwrites old network traffic after a threshold is reached,
   receive information,
   identify a capture condition based on the received information,
   retrieve, based on the identified capture condition, a set of capture components from a database that includes a plurality of sets of capture components, each set of capture components being associated with a particular capture condition, and
   archive at least a portion of the network traffic that has already been recorded by the set of capture components before the capture condition was identified.

36. The computer program product of claim 35, which causes the processor to maintain an association of the archived portion of the recorded network traffic with the received information.

37. The computer program product of claim 35, wherein the identified capture condition is an association with an application.

38. The computer program product of claim 35, wherein the identified capture condition is an association with a user.

39. The computer program product of claim 35, which causes the processor to store the archived portion of the recorded network traffic in an archive file separate from the recorded network traffic.

40. The computer program product of claim 39, which causes the processor to store the archive file at the same location as the recorded network traffic.

41. The computer program product of claim 39, which causes the processor to transmit the archive file to a repository.

42. The computer program product of claim 35, which causes the processor to lock the archived portion of the recorded network traffic to prevent an overwriting or deletion of the archived portion.

43. The computer program product of claim 35, which causes the processor to filter the network traffic in the archived portion of the recorded network traffic.

44. The computer program product of claim 35, which causes the processor to execute an analysis of the network traffic recorded in the archived portion of the recorded network traffic.

45. The computer program product of claim 44, wherein the analysis includes a simulation.

46. The computer program product of claim 35, wherein the received information includes a problem description.

47. The computer program product of claim 46, wherein the problem description includes a problem time.

48. The computer program product of claim 35, which causes the processor to provide a user interface that is configured to receive the information.

49. The computer program product of claim 48, wherein the received information includes a sequence of start and stop commands.

50. The computer program product of claim 35, which causes the processor to instruct a trouble ticking component to manage a plurality of trouble tickets corresponding to a plurality of problems.

51. The computer program product of claim 50, which causes the processor to transmit a notification message to the trouble ticketing component.

* * * * *